United States Patent
Doebel et al.

(10) Patent No.: US 11,531,531 B1
(45) Date of Patent: Dec. 20, 2022

(54) NON-DISRUPTIVE INTRODUCTION OF LIVE UPDATE FUNCTIONALITY INTO LONG-RUNNING APPLICATIONS

(71) Applicant: Amazon Technologies, Inc., Seattle, WA (US)

(72) Inventors: Bjoern Doebel, Dresden (DE); Martin Thomas Pohlack, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 15/916,099

(22) Filed: Mar. 8, 2018

(51) Int. Cl.
| | |
|---|---|
| G06F 8/60 | (2018.01) |
| G06F 8/656 | (2018.01) |
| G06F 8/65 | (2018.01) |
| G06F 8/71 | (2018.01) |
| G06F 9/48 | (2006.01) |

(52) U.S. Cl.
CPC .................. *G06F 8/65* (2013.01); *G06F 8/71* (2013.01); *G06F 9/485* (2013.01)

(58) Field of Classification Search
CPC ........ G06F 8/656; G06F 8/60–65; G06F 8/71; G06F 9/485; G06F 9/45558
USPC .................................. 717/168–178, 100–178
See application file for complete search history.

(56) References Cited

U.S. PATENT DOCUMENTS

| | | | |
|---|---|---|---|
| 5,359,730 A | 10/1994 | Marron | |
| 6,418,444 B1 | 7/2002 | Raduchel et al. | |
| 6,513,050 B1 | 1/2003 | Williams et al. | |
| 6,594,822 B1 | 7/2003 | Schweitz et al. | |
| 6,629,315 B1* | 9/2003 | Naylor | G06F 8/656 |
| | | | 717/168 |
| 6,941,410 B1* | 9/2005 | Traversat | G06F 9/4493 |
| | | | 711/6 |
| 7,222,341 B2 | 5/2007 | Forbes et al. | |
| 7,574,699 B1 | 8/2009 | Simmons | |
| 7,784,044 B2 | 8/2010 | Buban et al. | |
| 7,831,838 B2 | 11/2010 | Marr et al. | |
| 8,165,998 B2 | 4/2012 | Semerdzhiev | |
| 8,327,351 B2 | 12/2012 | Paladino et al. | |
| 8,468,516 B1* | 6/2013 | Chen | G06F 8/656 |
| | | | 717/170 |
| 8,510,596 B1 | 8/2013 | Gupta et al. | |
| 8,528,087 B2 | 9/2013 | Hsu et al. | |
| 8,607,208 B1* | 12/2013 | Arnold | G06F 8/656 |
| | | | 717/153 |

(Continued)

OTHER PUBLICATIONS

Wikipedia, "Comparison of executable file formats", Retrieved from URL: https://en.wikipedia.org/wiki/Comparison_of_exectable_file_formats on Jul. 7, 2016, pp. 1-5.

(Continued)

*Primary Examiner* — Chat C Do
*Assistant Examiner* — Noor Alkhateeb
(74) *Attorney, Agent, or Firm* — Robert C. Kowert; Kowert, Hood, Munyon, Rankin & Goetzel, P.C.

(57) ABSTRACT

An execution of an instance of a program that does not include checkpoint-based live update functionality is paused. A set of objects containing state information of the program is identified from a portion of memory used by the instance, and stored in a checkpoint of the program. The execution of the instance is resumed using at least the checkpoint and code that has been dynamically introduced into the instance.

20 Claims, 10 Drawing Sheets

(56) References Cited

U.S. PATENT DOCUMENTS

| | | | |
|---|---|---|---|
| 8,762,495 B2 | 6/2014 | Obata et al. | |
| 8,782,632 B1* | 7/2014 | Chigurapati | G06F 8/656 |
| | | | 717/172 |
| 8,955,038 B2 | 2/2015 | Nicodemus et al. | |
| 9,164,754 B1 | 10/2015 | Pohlack | |
| 9,240,025 B1* | 1/2016 | Ward, Jr. | G06F 11/3006 |
| 9,292,332 B1* | 3/2016 | Liguori | G06F 8/65 |
| 9,335,986 B1* | 5/2016 | Bowen | G06F 8/656 |
| 9,449,042 B1 | 9/2016 | Evans et al. | |
| 9,594,553 B2 | 3/2017 | Ji | |
| 9,838,418 B1 | 12/2017 | Wardle | |
| 10,191,925 B1 | 1/2019 | Sherman et al. | |
| 10,261,780 B2* | 4/2019 | de Kruijf | G06F 8/656 |
| 11,200,047 B2 | 12/2021 | Doebel et al. | |
| 2002/0073409 A1* | 6/2002 | Lundback | G06F 11/1482 |
| | | | 717/170 |
| 2002/0178439 A1 | 11/2002 | Rich et al. | |
| 2004/0117768 A1* | 6/2004 | Chang | G06F 11/3636 |
| | | | 717/125 |
| 2004/0215668 A1* | 10/2004 | Sun | G06F 12/0891 |
| 2006/0288341 A1 | 12/2006 | Wurden et al. | |
| 2006/0288821 A1 | 12/2006 | Girard | |
| 2007/0005992 A1 | 1/2007 | Schluessler et al. | |
| 2008/0091837 A1* | 4/2008 | Langen | H04L 65/40 |
| | | | 709/230 |
| 2009/0094624 A1* | 4/2009 | Craft | G06F 9/4856 |
| | | | 719/331 |
| 2009/0204636 A1 | 8/2009 | Li | |
| 2009/0257595 A1 | 10/2009 | de Cesare et al. | |
| 2010/0146325 A1 | 6/2010 | John | |
| 2010/0269105 A1 | 10/2010 | Arnold | |
| 2011/0035733 A1 | 2/2011 | Horning et al. | |
| 2011/0283256 A1 | 11/2011 | Raundahl Gregersen et al. | |
| 2012/0011083 A1 | 1/2012 | Storms et al. | |
| 2012/0096250 A1* | 4/2012 | Aloni | G06F 8/656 |
| | | | 713/2 |
| 2012/0144416 A1* | 6/2012 | Wetzer | H04N 21/41265 |
| | | | 725/14 |
| 2012/0166811 A1 | 6/2012 | Maheshwari et al. | |
| 2013/0019231 A1 | 1/2013 | Mangard et al. | |
| 2013/0232343 A1 | 9/2013 | Horning et al. | |
| 2013/0246837 A1 | 9/2013 | Wolf | |
| 2014/0215452 A1* | 7/2014 | Hicks | G06F 8/656 |
| | | | 717/172 |
| 2014/0282431 A1* | 9/2014 | Delio, Jr. | G06F 11/3466 |
| | | | 717/130 |
| 2014/0325644 A1 | 10/2014 | Oberg et al. | |
| 2014/0359239 A1 | 12/2014 | Hiremane et al. | |
| 2015/0007319 A1 | 1/2015 | Antonov | |
| 2015/0113518 A1 | 4/2015 | Liem et al. | |
| 2015/0229737 A1* | 8/2015 | Oyama | H04L 67/32 |
| | | | 709/217 |
| 2015/0304351 A1 | 10/2015 | Oberheide et al. | |
| 2015/0370685 A1 | 12/2015 | Heymann et al. | |
| 2016/0062765 A1 | 3/2016 | Ji et al. | |
| 2016/0147586 A1 | 5/2016 | Mayer | |
| 2016/0203313 A1 | 7/2016 | El-Moussa et al. | |
| 2017/0083399 A1 | 3/2017 | Smirnov | |
| 2017/0177272 A1 | 6/2017 | Ilangovan et al. | |
| 2017/0177330 A1 | 6/2017 | Yu | |
| 2018/0052997 A1 | 2/2018 | Wray et al. | |
| 2019/0220367 A1* | 7/2019 | Kashi Visvanathan | |
| | | | G06F 11/1464 |

OTHER PUBLICATIONS

Wikipedia, "Dynamic software updating", Retrieved from URL: https://en.wikipedia.org/wiki/Dynamic_software_updating on Jun. 18, 2016, pp. 1-9.

"Executable and Linkable Format (ELF)", Tool Interface Standards (TIS), Portable Formats Specification, Version 1.1, 2001, pp. 1-60.

Wikipedia, "ptrace", Retrieved from URL: https://en.wikipedia.org/wiki/Ptrace on Jul. 13, 2016, pp. 1-4.

"Advisories, publicly release or pre-released", Xen Aecurity Advisories, Retrieved from URL: http://xenbits.xen.org/xsa/on Jun. 18, 2016, pp. 1-9.

U.S. Appl. No. 15/252,038, filed Aug. 30, 2016, Bjoern Doebel et al.

"Linux Filesystem Hierachy: Chapter 1", Retrieved from URL: http://www.tldp.org/LDP/Linux-Filesystem-Hierarchy/html/proc.html on Jan. 22, 2018, pp. 1-35.

"Linux Programmer's Manual", Retrieved from URL: http://man7.org/linux/man-pages/man8/ld.so.8.html on Jan. 22, 2018, pp. 1-14.

"Viewing and Editing Memory in WinDbg", Retrieved from URL: https://docs.microsoft.com/en-us/windows-hardware/drivers/debugger/memory-window on Jan. 22, 2018, pp. 1-11.

R. Holmes and D. Notkin, "Identifying program, test, and environmental changes that affect behaviour," 2011 33rd International Conference on Software Engineering (ICSE), Honolulu, HI, 2011, pp. 371-380. (Year: 2011).

K. Jezek, L. Holy, A. Slezacek and P. Brada, "Software Components Compatibility Verification Based on Static Byte-Code Analysis," 2013 39th Euromicro Conference on Software Engineering and Advanced Applications, Santander, 2013, pp. 145-152. (Year: 2013).

E. Kodhai and B. Dhivya, "Detecting and investigating the source code changes using logical rules," 2014 International Conference on Circuits, Power and Computing Technologies [ICCPCT-2014], Nagercoil, 2014, pp. 1603-1608. (Year: 2014).

U.S. Appl. No. 16/797,827, filed Feb. 21, 2020, Bjoern Doebel et al.

Fuhao Zou, et al. "Copact Image Fingerprint Via Multiple Kernel Hashing," IEEE Transactions on Multimedia, vol. 17, No. 7, Jul. 2015, pp. 1006-1018.

Yufei Gu, et al, "Multi-Aspect, Robust and Memory Exclusive Guest OS Fingerprinting," IEEE Transactions on Cloud Computing, vol. 2, No. 4, Oct.-Dec. 2014 pp. 380-394.

* cited by examiner

NON-DISRUPTIVE INTRODUCTION OF LIVE UPDATE FUNCTIONALITY INTO LONG-RUNNING APPLICATIONS

BACKGROUND

Many mission-critical computing applications rely on network-accessible services, e.g., using virtualized resources at cloud-based provider networks. In order to support such applications, the operators of the provider networks may utilize large fleets of hardware servers, which may sometimes comprise thousands of hosts spread over many data centers in many different geographical locations. At least some of the programs used to implement such services, including for example various administrative virtualization management-related programs run locally at virtualization hosts, may be expected to run continuously for long periods of time (e.g., weeks, months or even years) to support targeted availability levels for customer applications. If such administrative programs are terminated for some reason, the customer application programs that rely on the administrative programs may potentially experience unacceptable service interruptions.

As with most programs, updates to the long-running programs may be required at various points in time, e.g., due to the identification of defects and corresponding fixes. Many new versions of the long running programs may therefore be developed over time, representing functional enhancements, support for newer hardware, defect removals, and so forth. In some cases, the functionality enhancements may enable live updates—e.g., starting with a particular version of a program, it may become possible to update a given instance of the program without terminating that instance. Because of the undesirability of program termination, however, a potentially large number of older instances of long running programs may remain operating without live update capabilities. Such situations may be especially likely in scenarios in which the rate at which new versions of the long-running programs are produced and deployed is high.

As more defects are identified and fixed in long running programs over time, leaving the older versions operational may increase the probability of failures of the applications being run with the help of the programs. When deciding whether an older version of a given long-running program instance should be allowed to remain active even though newer and functionally superior versions of the program are available, administrators may thus be faced with a non-trivial technical challenge, especially in scenarios where defects in the programs could potentially compromise the security of customer applications or infrastructure components.

Figure 1:
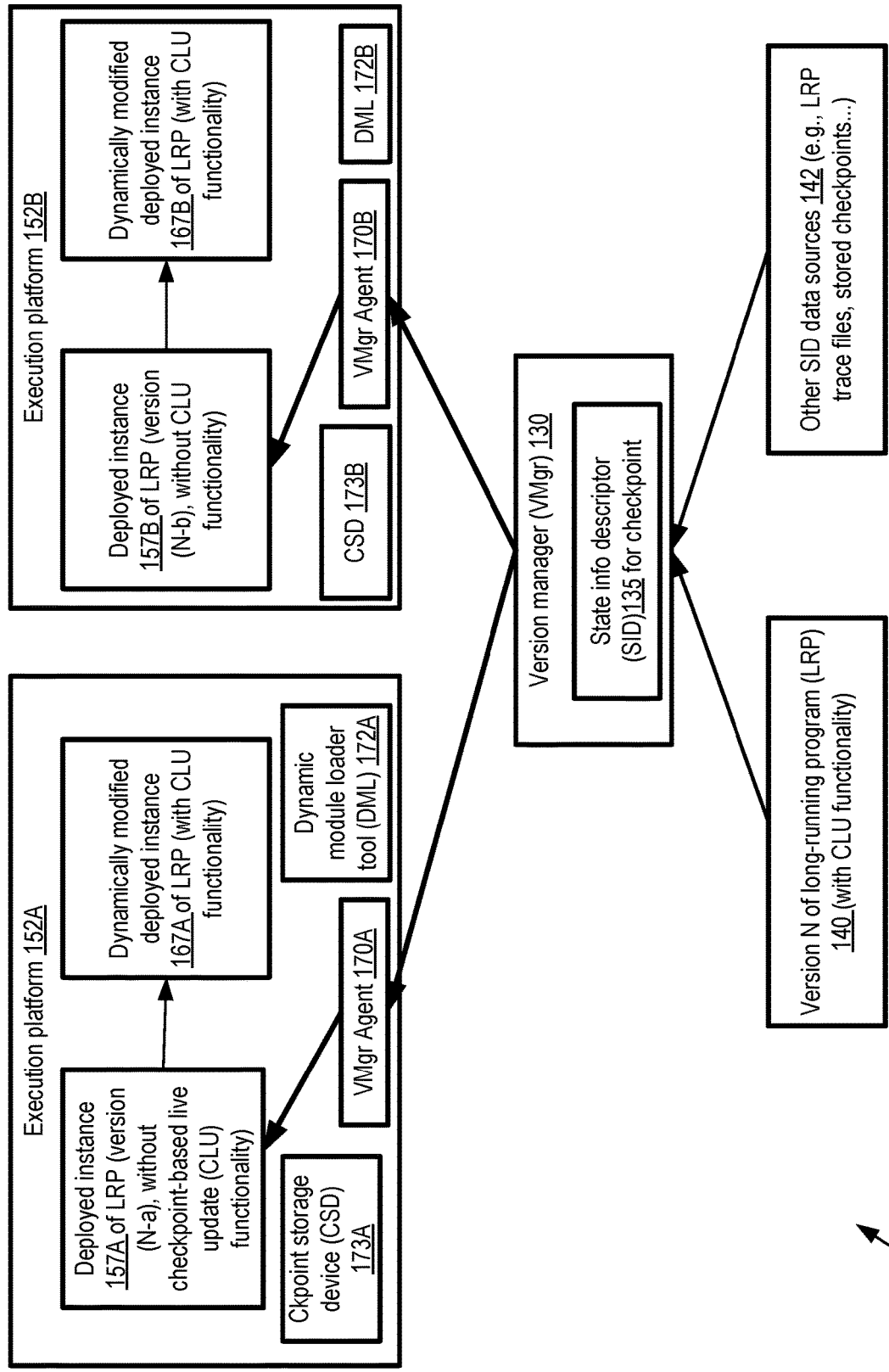
FIG. 1 illustrates an example system environment in which live update functionality may be introduced in a non-disruptive manner into running instances of older versions of a long-running application, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for introducing live update capabilities into deployed instances of software programs, without requiring the termination of the instances, are described. In some embodiments, live update functionality may be introduced into old versions of programs that have been running, without being terminated, for weeks, months, or even years. Such programs, which may for example be used for administration and configuration of resources in large networks, may be referred to as long-running programs in various embodiments. The term "live update" may refer in at least some embodiments to a feature that enables a program to remain up and running across program updates—that is, a change to the version of the program which is being used at a particular execution platform is typically performed without terminating the processes or threads of execution which collectively make up the program, without closing open files and network connections of the program, and so on. As one skilled in the art will appreciate in light of this disclosure, certain embodiments may be capable of achieving various advantages, including some or all of the following: (a) enabling defect fixes and functionality enhancements to be added to continuously operating programs which did not support live updates when the programs were instantiated, without disrupting applications that rely on or communicate with the continuously operating programs, (b) enhancing the security of network-accessible services, such as various types of cloud-based services, which often rely on long-running programs for critical infrastructure components, and/or (c) reducing the number of different versions of a program that have to be maintained and managed in large computing environments, thereby reducing the storage and computing overhead associated with software configuration management in such environments.

According to some embodiments, a descriptor indicating elements of state information of a long-running program, at least some of which may help to enable the continued functioning of the program across an update, may be obtained at a version management tool or service responsible for introducing live update functionality. Such a tool or service may be referred to as a version manager and/or a software configuration manager in various embodiments. A version manager may include a set of hardware and/or software components implemented at one or more computing devices in some embodiments. In at least one embodiment, the state information descriptor (SID) may be obtained from a newer version of the long running program which includes checkpoint-based live update (CLU) functionality; that is, from such a newer version, a checkpoint comprising various elements of program state may be saved, and later re-read as needed as part of a live update to the newer version. Consider two example versions VA and VN of a particular long-running program LRP1, where VA was developed and deployed earlier than VN, and where VN includes checkpoint-based live update functionality while VA does not. In some embodiments, a version manager may examine the live-update-enabled version VN of the program (e.g., the object and/or source code representation of VN) to obtain the SID. Note that in some cases, one or more of the elements of state information of VN indicated in the SID may not necessarily be available in exactly the same form (or with the same name) in earlier versions of LRP1.

The version manager may examine one or more other currently-deployed running versions of the long running program at respective execution platforms, e.g., to determine whether checkpoint-based live update functionality is to be added to the currently-deployed versions. In one embodiment, respective agents of the version manager may be instantiated, at least temporarily, at various ones of the execution platforms to perform at least a portion of the work required to dynamically introduce or add CLU functionality at the execution platforms. In some embodiments, if the version manager or its agent determines that the particular version being used for a deployed instance DI1 does not include support for checkpoint-based live updates, a workflow to introduce CLU functionality into that deployed instance DI1 may be initiated. A mechanism to temporarily pause at least some types of operations of DI1 may be invoked in some embodiments—e.g., the logical equivalent of a "kill-STOP" command may be directed to one or more processes of DI1 by the version manager or its agent, which pauses operations of the program without closing open files, open network connections and the like.

From a portion of the memory being used by the deployed instance DI1, one or more objects comprising at least a portion of the state information indicated in the SID may be identified and extracted in various embodiments. A checkpoint comprising the identified objects may be stored in some embodiments, e.g., at a persistent storage device.

In at least some embodiments, a dynamically loadable module comprising code to implement checkpoint-based live update may be introduced or added into the deployed instance DI1 which had earlier been paused. Using the dynamically loaded module and the checkpoint, the execution of the paused instance DI1 may be resumed in various embodiments. In effect, a new version of DI1 which supports checkpoint-based live updates may be created in such embodiments, without requiring DI1 to be terminated, and without disrupting communications of DI1's process(es) with other processes or programs. In some embodiments, the extraction of state information and/or the storage of the checkpoint may also be performed using one or more dynamically loaded modules—e.g., a single module that is capable of extracting state information from the memory of the deployed instance, storing the checkpoint, and then resuming operations from the checkpoint's state may be dynamically loaded into the deployed instance.

In some embodiments, the source code corresponding to various versions of a long-running program may evolve over time, such that at least some of the elements of state information available in a new, CLU-enabled version VN may not be present, or be hard to identify, in the old non-CLU-enabled version VA. For example, a new data structure DS1 storing state information may have been added to the program between the time that VA was written/built and the time that VN was written/built, and DS1 may be included in the state information descriptor used to extract and save a checkpoint of an operational. In one embodiment, the version manager may determine, e.g., when examining the memory of a deployed instance of an older version, that a data structure equivalent to DS1 is not present in the older version. However, a dynamically loaded module that is to be introduced in the older version to implement CLU may still expect DS1 to be present in the checkpoint used to resume the program in such an embodiment. Accordingly, the version manager may insert a "dummy" or synthetic version of DS1 into the checkpoint of the older version in at least some embodiments. The contents of the dummy or synthetic version may vary in different embodiments—e.g., a data structure of the correct size, but comprising all zeros may be stored, a data structure with randomized contents may be stored, or an object whose contents are selected so as to indicate its invalidity as an example of DS1 (for example, a negative number for a file descriptor or network port) may be generated and stored.

Any of a number of different approaches may be employed in various embodiments with respect to identifying the state information descriptor to be used for generating checkpoints of running/operational older versions of long-running programs. In some embodiments, the descriptor may comprise a set of tuples, with a given tuple comprising an indication of a name of an object or data structure, an indication of a location (e.g., a memory offset) of the object or structure, the size and/or data type of the structure, and so on. In one embodiment, the source code of a new version of a long running program (LRP), which does include CLU functionality, may be analyzed to obtain the descriptor— e.g., the names of various objects and data structures included in the checkpoint-generating source code of the new version may be extracted. In another embodiment, object code of the new version may be analyzed—e.g., the code may be disassembled, and parameters of writes directed to a checkpoint object or file may be identified to generate a list of the objects. In one embodiment, a program tracing tool (e.g., similar to the "ptrace" tool available in some operating systems) may be used to record a trace of the creation of a checkpoint by the newer version of the program, and the trace entries may be examined to determine the tuples of the state information descriptor.

In some embodiments, debug information associated with the older version of an LRP may be used to determine the memory locations at which various elements of state information can be obtained for checkpointing. In one embodiment, for example, a build-related database or repository in which various shipped versions of the LRP and associated metadata are stored may also include debug information such as the symbols and offsets of various objects of the program. In one embodiment, source code of the older version may be used to determine where the state information elements can be accessed. In at least one embodiment, some of the state information to be included in a checkpoint may be stored in dynamically-allocated portions of memory, such as the equivalent of linked lists and the like. In one such embodiment, a chain of one or more pointers into dynamically-allocated objects may have to be followed to extract the state information. In some embodiments, a trace tool or a debugger may be used to extract state information to be stored as part of a checkpoint of the older operational version of the LRP—for example, a debugger or trace tool may be attached to a running process of the LRP, and the memory of that process may be examined to obtain the state information. In at least one embodiment, an operating system being used for the old version of an LRP may enable access to the memory being used by the LRP via a filesystem-like interface (similar to the "/proc" interface supported in some operating systems), and such an interface may be used to populate the contents of a checkpoint in accordance with a state information descriptor.

Any of several approaches may be used to resume operations of a paused instance of a deployed LRP after its checkpoint has been stored in different embodiments. In one embodiment, a mechanism similar to the "exec" function of the C programming language may be used from within the modified version of the LRP itself. In another embodiment, a command or signal may be directed to a paused process of the LRP from another process (e.g., from a version manager daemon).

According to some embodiments, a version manager may implement one or more programmatic interfaces, such as a set of application programming interfaces (APIs), a web-based console, a command-line tool, and or a graphical user interface which can be used by clients to submit version management requests. In one such embodiment, a request indicating one or more operational or deployed instances of a long-running program, which are to be modified to dynamically incorporate CLU functionality in a non-disruptive manner, may be submitted via such an interface to a version manager. In some embodiments, a programmatic request directed to the version manager may include a descriptor indicating the elements of state information to be saved in checkpoints of the LRP, and/or a set of credentials which may be required to modify the deployed instances of the LRP.

Example system environment

FIG. 1 illustrates an example system environment in which live update functionality may be introduced in a non-disruptive manner into running instances of older versions of a long-running application, according to at least some embodiments. As shown, system 100 may comprise a version manager 130 responsible for various aspects of software configuration of one or more long-running programs. Over time, a number of versions of a particular long-running program (LRP) may be created and deployed to execution platforms in the depicted embodiment. For example, one deployed instance 157A of the LRP, running at execution platform 152A, may represent a version (N-a) of the LRP, which does not include support for checkpoint-based live updates (CLU). Another deployed instance 157B may correspond to a different version (N-b), which also does not implement CLU capabilities. The terms "deployed instance" and "operational instance" may be used in various embodiments to refer to an instance of a long running program that comprises one or more currently instantiated processes or threads of execution. Any of various types of computing devices may be used as execution platforms 152 in different embodiments—e.g., for some types of LRPs used for cloud computing infrastructure, rack-based servers may be used as execution platforms. Some long-running platforms to which CLU features may be introduced non-invasively using techniques similar to those described herein may run on desktop computers, laptops, industrial control devices, Internet-of-Things (IoT) devices and the like.

A new version, Version N 140 of the LRP, which natively supports checkpoint-based live updates, may be developed at some point in time in the depicted embodiment. Based at least in part on examining version N (e.g., an object file and/or a set of source files corresponding to version N), a state information descriptor 135 for creating checkpoints of the LRP from deployed instances while the instances remain running may be obtained by the version manager 135 in some embodiments. In at least one embodiment, one or more other data sources 142, such as trace files recording low-level events including reads and writes that occur during the creation of a checkpoint by version N, and/or files containing such checkpoints themselves, may be used to generate an SID 135. In various embodiments, an SID may comprise some number of tuples, with an individual tuple including a name or other semantic information pertaining to an element of program state, a location (e.g., a memory offset) or address where a value for the element may be obtained, a size and/or a datatype of the element.

The responsibilities of the version manager and its agents 170 (e.g., agents 170A and 170B at execution platforms 152A and 152B respectively) may comprise at least the following high-level tasks with respect to adding CLU functionality to deployed instances of older versions such as (N-a) and (N-b) in the depicted embodiment. With the help of the SID 135, for a given operational instance 157 of an older version of LRP, elements of state information that are to be stored in a local checkpoint may be extracted in some embodiments from the memory being used by that operational instance. At least some operations of the running LRP instance 157 may be paused briefly in at least one embodiment, without disrupting the connectivity and I/O functionality of the instance and without terminating the instance, so that for example files or network sockets that are open prior to the initiation of the brief pause phase may remain open during the brief pause phase. A local checkpoint comprising the elements of state information may be stored at a storage device 173 (e.g., 173A or 173B) that can be accessed from the operational instance in various embodiments. Any of a variety of storage devices types may be used in different embodiments, including moving disk-based devices, solidstate devices, and the like. In at least one embodiment, at least a portion of the checkpoint may be stored at a network-accessible storage service instead of, or in addition to, being stored locally at the execution platform.

According to at least some embodiments, a dynamic module loader (DML) tool 172, e.g., 172A or 172B, may be used to introduce or add a module that implements a live update capability into the paused instance 157. Such a module may, for example, be generated as part of the development and build of version N, and transmitted to respective agents 170 by the version manager 130 in various embodiments. As a result, a dynamically modified deployed instance 167(e.g., 167A or 167B) may be created at an execution platform 152 in the depicted embodiment. The saved checkpoint and the dynamically loaded module may be used to resume operations that were paused prior to the creation of the checkpoint in the depicted embodiment. After a given deployed instance has been modified to enable checkpoint-based live updates, the instance may be updated to any appropriate version (e.g., to version N itself, or subsequent versions N+1, N+2, etc.). As a result, the defect fixes and functional or performance-related enhancements that are identified during subsequent design and development of the LRP may be applied to the modified deployed instances in the depicted embodiment, rendering the fleet of deployed LRP instances more robust, performant and secure than if the CLU capability had not been added, without terminating the individual instances or disrupting other applications that rely on the LRP.

The complexity of identifying and extracting the state information from the memory of respective running instances 157 may vary in the depicted embodiments, depending for example on the extent to which the corresponding older versions of the LRP differ from the CLU-enabled version N, the extent to which state information is stored in dynamically-allocated portions of memory versus statically-allocated portions, and/or other factors. Consider a simple scenario in which, when creating a checkpoint from version N, a set of objects named (O1, O2, . . . , Ok) is saved from various locations within statically allocated memory of an instance of version N. If, in a given older version such as (N-a), each of the objects (O1, O2, . . . , Ok) is also present and allocated in static memory, the task of extracting the state information for version (N-a) may be relatively straightforward in some embodiments. For example, symbol tables and/or other debugging information, which may be available from a build-related artifact database of the development environment at which version (N-a) was generated, may be used to extract the values of the objects (O1, O2, . . ., Ok). If, however, at least some of the state information containing objects of version N are not present in the same form in version (N-a), or at least some of the objects are dynamically allocated, this may complicate the task of extracting the state information in various embodiments. Pointers to the dynamically allocated objects (which may in turn comprise pointers to other elements of state information) may have to be followed in at least some embodiments.

In at least one embodiment, if a particular state information data structure SD1 that is checkpointed in version N of the LRP, and is therefore included in the state information descriptor 135 generated by the version manager, is not present in an earlier version (N-a) or (N-b), a different data structure that contains logically equivalent data in the older version may be identified and saved in the local checkpoint. In some embodiments, it may be the case that there is no logically equivalent data structure in the older version, in which case a dummy or synthetic version of the data structure may be generated and stored in the local checkpoint, as discussed below in further detail.

According to some embodiments, the version manager 130 and/or its agents 170 may be implemented as part of a network-accessible service or tool, to which requests for introducing CLU functionality may be submitted via programmatic interfaces such as APIs, web-based consoles, command-line tools, and/or graphical user interfaces. Such a programmatic request may, for example, include an indication of the targeted operational instances of older versions of an LRP, the credentials to be used to access and modify those deployed instances, and/or the elements of state information to be checkpointed (e.g., in the form of a state information descriptor similar to SID 135 of FIG. 1). In one embodiment, various artifacts associated with LRP development and deployment, such as source code corresponding to the different LRP versions, the shipped/finalized versions of the binaries of the LRP versions, build metadata (such as the arguments/parameters used for building the versions) and/or debug information pertaining to the versions may be accessed by the version manager 130 to modify the LRPs.

Example Timeline

Figure 2:
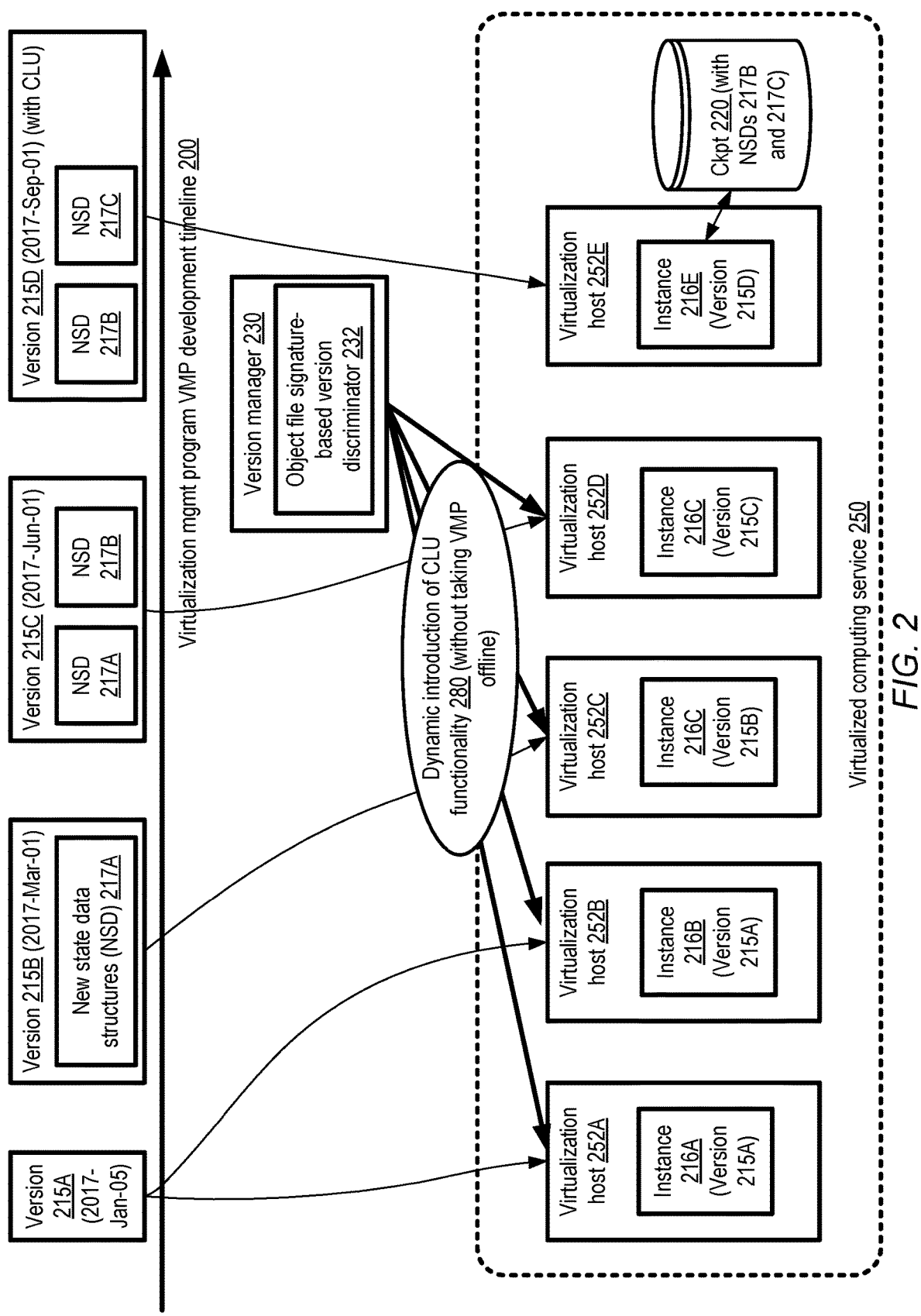
FIG. 2 illustrates an example timeline of the development and deployment of a virtualization management-related long running program, according to at least some embodiments.

Network-accessible services which provide virtualized computing may utilize a number of long-running programs for which the inclusion of live update capabilities may be extremely helpful in various embodiments. FIG. 2 illustrates an example timeline of the development and deployment of a virtualization management-related long running program, according to at least some embodiments. Along development timeline 200, example dates at which four versions of a virtualization management program VMP become available for production use are shown. Version 215A is available in January 2017, version 215B is available in March 2017, and version 215C is available in June 2017, while version 215D is available in September 2017. In the depicted example scenario, the first version that includes built-in support for checkpoint-based live updates (CLU) is version 215D; the earlier versions 215A, 215B and 215C do not start out with CLU support.

A virtualization management service 250 at which VMP is used may comprise a large number of virtualization hosts 252, such as 252A-252E. As new versions of VMP are released, they may be transmitted to and deployed on at least a subset of the hosts 252. At the hosts, they may be used to implement guest virtual machines for various clients of the service 250—e.g., by acting as intermediaries between the guest virtual machines and the hardware, for implementing various aspects of networking, storage I/O and the like and so on. For example, at some point in time corresponding to the state of service 250 depicted in FIG. 2, respective instances 216A and 216B of version 215A of the VMP are running at virtualization hosts 252A and 252B, instance 216C of version 215B is running at host 252C, instance 216D of version 215C is running at host 252D, and instance 216E of version 215D is running at host 252E. In at least some embodiments, when a new version of VMP becomes available, a copy of the new version may be stored at persistent devices (e.g., disk-based devices) of the virtualization hosts, but the older versions of VMP that were already running may be allowed to continue to run, since termination of the older running instances may cause disruption to guest virtual machines and applications running at the guest virtual machines. The newest versions may be stored at the persistent storage devices of the virtualization hosts in such embodiments so that, in the event that the VMP is terminated and then restarted, the newest versions are used for the restart.

During the development of VMP in the depicted example scenario, new data structures may be created in different versions, including some data structures that store state information which may be required for resuming paused instances of VMP. Such data structures, whose contents may be included in checkpoints, may be referred to as new state data structures (NSDs) in the depicted embodiment. For example, version 215B includes NSD 217A, version 215C includes NSDs 217A as well as 217B, while version 215D includes NSDs 217B and 217C. Note that version 215D does not include NSD 217A which was introduced into the VMP at version 215B. When a checkpoint 220 is generated from instance 216E of version 215D, the state information stored in the checkpoint may include NSDs 217B and 217C in the depicted embodiment.

The version manager 230 may be responsible for the dynamic introduction of CLU functionality 280 into at least some of the deployed and running instances of VMP in the depicted embodiment. In some embodiments, a version discriminator tool 232 which uses object-file based signatures to identify the versions of different deployed instances may be used by the version manager 230 to ascertain the particular versions to which instances 216 correspond. The version manager 230 may obtain or generate a state information descriptor for checkpoint information stored by version 215D, and then use that state descriptor to capture equivalent state information from the older running instances in various embodiments prior to dynamically loading a module implementing live updates into those instances.

The task of generating a checkpoint for an older instance may be somewhat complicated because exact matches for some of the state information data stored in version 215D checkpoints may not be available in the older versions—e.g., version 215C does not include NSD 217C, and versions 215A and 215B include neither NSD 217B nor NSD 217C. With respect to version 215C, NSD 217C may be considered a "missing" NSD in the depicted embodiment, while NSDs 217B and 217C may both be considered missing NSDs with respect to versions 215A and 215B. In some embodiments, when creating the checkpoints of an older version, the version manager 230 may insert dummy/synthetic versions of the missing NSDs as discussed below in further detail. In at least one embodiment, the version manager 230 may be able to identify, within the memory being used by the running instance of an older version of VMP, analogous information to that stored in the missing NSDs, and store the analogous information in the checkpoint of the older version. For example, if a missing NSD is a list of port numbers in use for a particular class of network connection, the version manager may be able to find individual port numbers in use for that class of network connections in an older version, and generate a corresponding list even if such a list data structure was not originally created in the source code of the older version.

Figure 3:
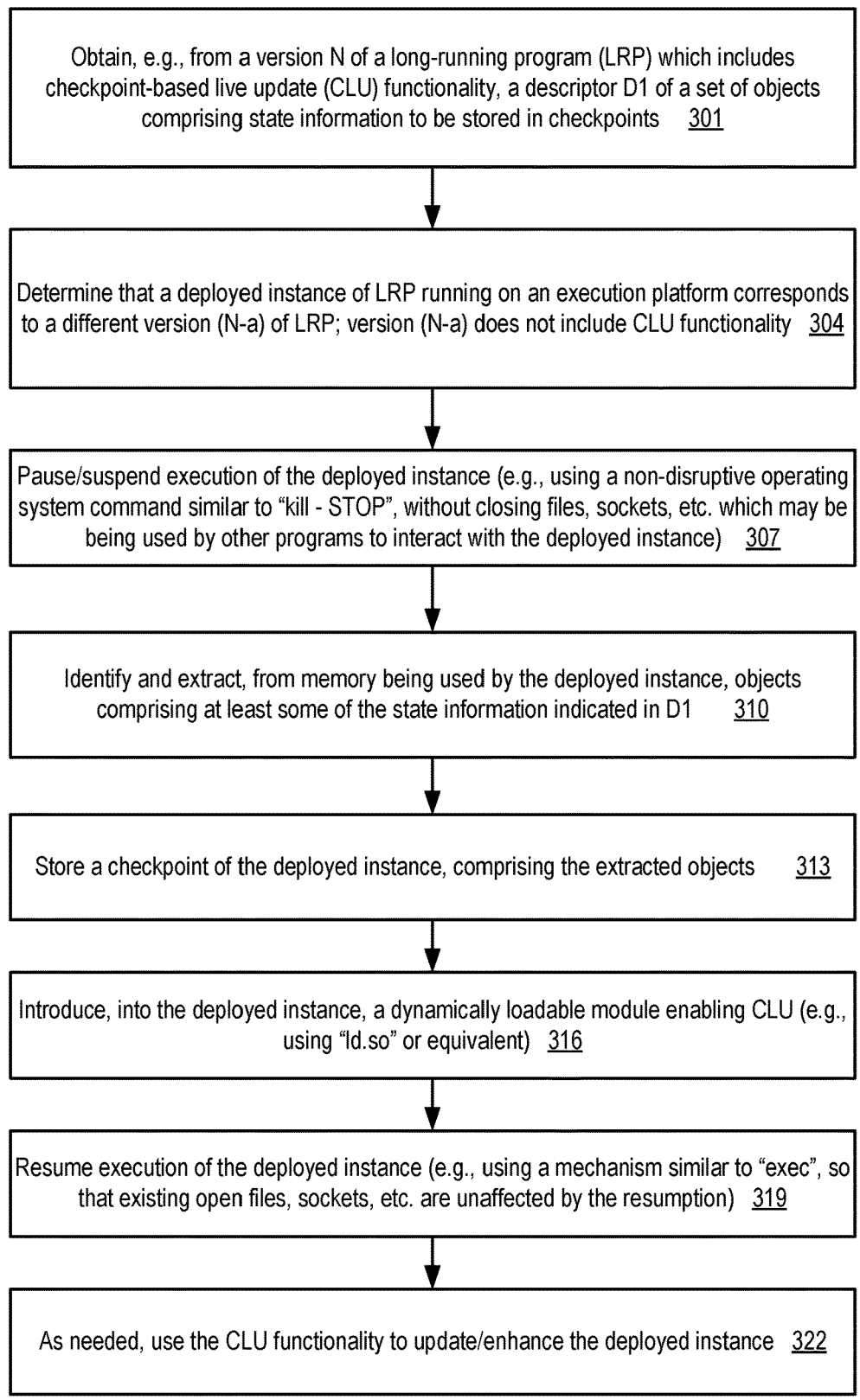
FIG. 3 is a flow diagram illustrating aspects of operations that may be performed to introduce checkpoint-based live update capabilities into deployed instances of long-running programs, according to at least some embodiments.

Methods For Non-Disruptive Introduction Of Checkpoint-Based Live Update Functionality FIG. 3 is a flow diagram illustrating aspects of operations that may be performed to introduce checkpoint-based live update capabilities into deployed instances of long-running programs, according to at least some embodiments. As shown in element 301, a version manager tool or service may obtain, for example from a version N of a long-running program (LRP) which includes checkpoint-based live update (CLU) functionality, a descriptor D1 of a set of objects comprising elements of state information to be stored in checkpoints for that version. A number of techniques may be used singly or in combination to obtain the descriptor in different embodiments, depending on the kinds of data to which the version manager has access; such techniques may include examining the source code of version N, examining object code of version N, examining a trace generated while an instance of version N created a checkpoint, examining contents of such a checkpoint itself, and so on. In at least some embodiments, the elements of state information may not necessarily be consolidated into a single descriptor as such; instead, a collection of separate indications of elements of state information may be obtained.

The version manager may determine that a deployed instance of LRP running on an execution platform corresponds to a different version (N-a) of LRP (element 304) in various embodiments, and that version (N-a) does not include CLU functionality. As such, such an instance may be considered a candidate for the non-disruptive introduction of CLU capabilities in at least some embodiments.

The execution of the identified candidate deployed instance may be paused or suspended briefly in the depicted embodiment (element 307), e.g., by the version manager or its agent. In at least some embodiments, a non-disruptive operating system command similar to "kill-STOP" may be used, which may pause at least some types of operations without closing files, sockets, etc. which may be being used by other programs to interact with the deployed instance.

From the portion of memory being used by the deployed instance, objects comprising at least some of the state information indicated in D1 may be identified and extracted in various embodiments (element 310). A number of different approaches may be used singly or in combination to extract the state information in various embodiments. In one embodiment, for example, a debugger or trace tool may be attached to the deployed instance, and contents of the memory at various locations corresponding to respective elements of the state information may be retrieved using the debugger or trace tool. In some embodiments, an operating system being used for the LRP may support a file-system-like interface for process memory contents (such as a "/proc/<LRP-pid>" directory, where a representation of the memory being used by the process with identifier LRP-pid may be accessible), and such an interface may be used to access the state information.

A checkpoint of the deployed instance, comprising the extracted objects, may be stored in various embodiments (element 313). In at least some embodiments, the checkpoint may be stored as one or more files on a local persistent storage device at the execution platform at which the older version of the LRP is running. In one embodiment, a network-accessible storage device may be used for the checkpoint. In one embodiment, the LRP instance may not necessarily be paused before at least a portion of the state information is obtained and/or saved in a checkpoint.

Having saved the checkpoint, a version manager may introduce a dynamically loadable module enabling CLU into the deployed instance (element 316) in the depicted embodiment. Any available dynamic loading tool, such as "ld.so" or its equivalent, may be used in various embodiments. In at least some embodiments, the module may be obtained from, or based on, version N of the LRP, whose source code was designed to implement CLU. In some embodiments, the module may for example include logic to (a) access a saved checkpoint of LRP state and (b) trigger the resumption, from the state corresponding to the checkpoint, of suspended operations of the LRP using an updated version of the LRP. In some embodiments, one or more dynamically loadable modules may also be used to extract the objects comprising state information from the memory of the deployed instance, and/or to store the checkpoint of the deployed instance. In at least one embodiment, for example, a single module that can extract the state information, store the checkpoint, and resume execution from the checkpoint may be dynamically loaded into the deployed instance.

After the module implementing CLU has been incorporated into the deployed instance, the execution of the instance may be resumed (element 319) in various embodiments. A mechanism similar to "exec" may be used in some embodiments, so that existing open files, sockets etc. remain open and are unaffected by the resumption. As needed, the CLU functionality may be employed to update and enhance the deployed instance over time in the depicted embodiment (element 322).

Example Long-Running Programs

Figure 4:
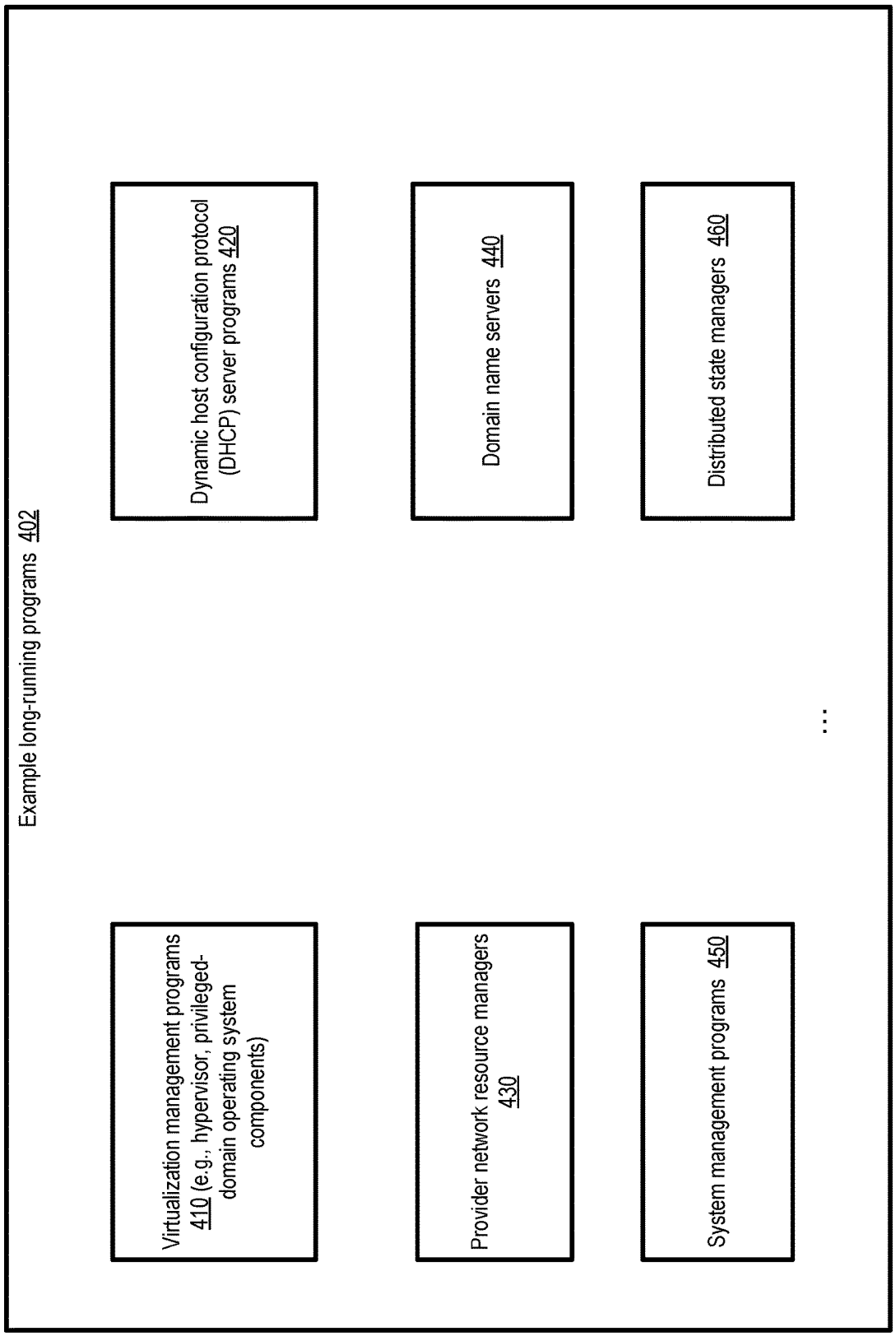
FIG. 4 illustrates examples of long-running programs into which live update functionality may be introduced non-disruptively, according to at least some embodiments.

FIG. 4 illustrates examples of long-running programs into which live update functionality may be introduced non-disruptively, according to at least some embodiments. As mentioned above, virtualization management programs 410 may represent one class of long-running programs 402. In some embodiments, virtualization management programs may include hypervisors (which may act as intermediaries between hardware devices and virtual machines at a host), each of which in turn may include one or more long-running user-mode programs and/or long-running kernel-mode programs or daemons. In at least one embodiment, a special operating system instance may be designated for virtualization management at a host (e.g., in addition to or instead of a hypervisor), and various programs or daemons making up the operating system may represent other examples of long-running programs.

A number of programs associated with networking protocols, including for example DHCP (Dynamic Host Configuration Protocol) server programs 420 and Domain Name System (DNS) servers 440 may also be appropriate candidates for non-disruptive introduction of checkpoint-based live update capabilities in various embodiments. Other long-running programs may include resource managers 430 associated with various network-accessible services of a provider network (such as storage service managers, machine learning service managers, and so on), system management programs 450 and/or distributed state managers 460 (which may for example be used for clustered applications and the like).

State Information Descriptors

Figure 5:
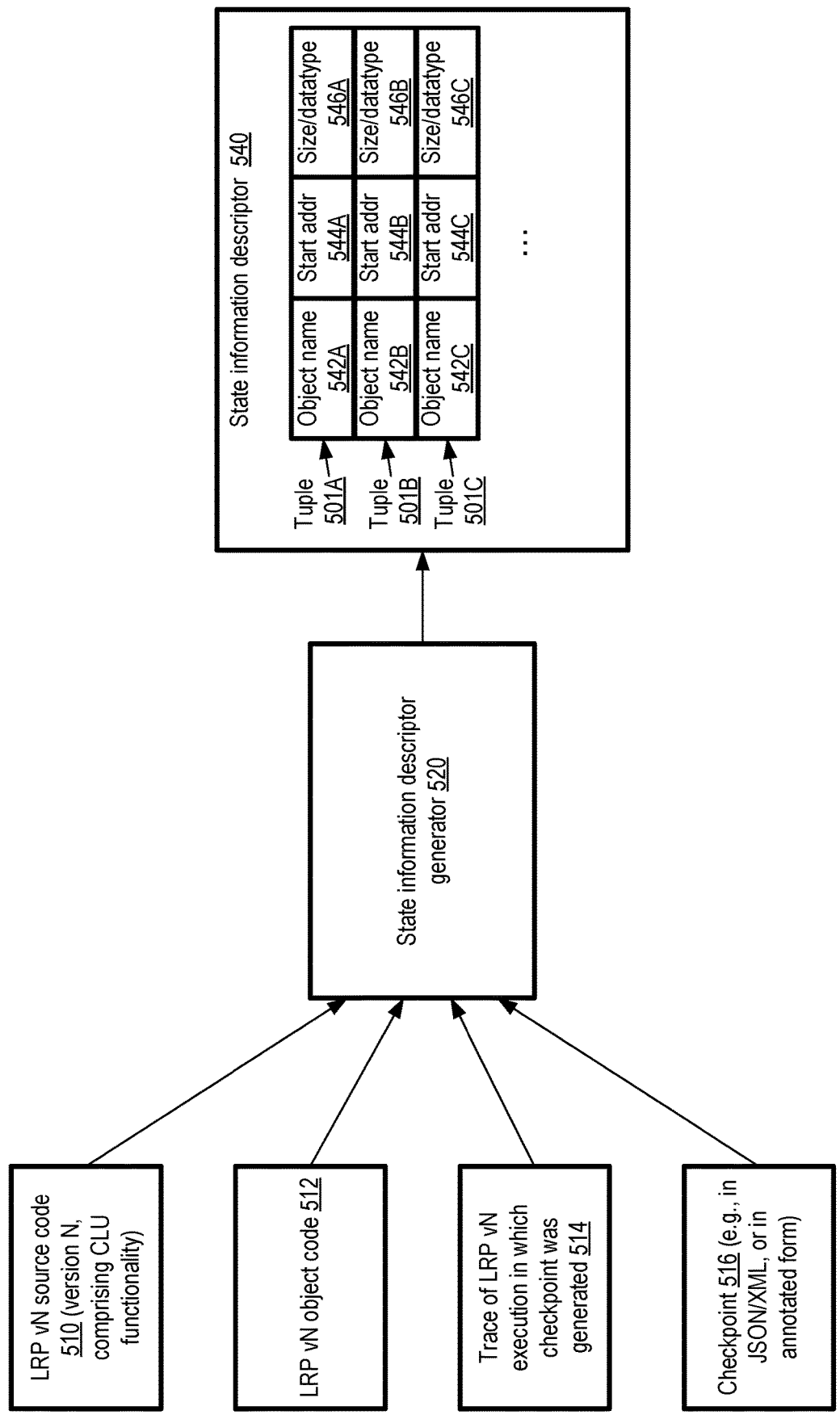
FIG. 5 illustrates an overview of example operations which may be performed to obtain a descriptor of state information to be saved in a checkpoint used for live updates of a program, according to at least some embodiments.

FIG. 5 illustrates an overview of example operations which may be performed to obtain a descriptor of state information to be saved in a checkpoint used for live updates of a program, according to at least some embodiments. In the depicted embodiment, a descriptor generator 520 (which may for example be a subcomponent of a version manager) may be responsible for determining information to be stored as a set of tuples 501 (e.g., tuples 501A, 501B or 501C) in a descriptor 540 which is to be used to create checkpoints of various versions of a long running program (LRP). The descriptor may represent an indicator of the elements of state information that may be needed for the program to execute correctly after being paused and resumed in the depicted embodiment, with individual tuples corresponding to respective elements of the state information. An individual tuple 501 may include, for example, a name 542 (e.g., 542A, 542B or 542C) of an object or data structure containing state information, a start address 544 (e.g., 544A, 544B or 544C) indicating where in memory the object is to be found, and a size or datatype 546 (e.g., 546A, 546B or 546C) of the object in the depicted embodiment. The data type (e.g., 4-byte integer, 64-byte string, etc.,) may indicate the size of the data structure in some embodiments. In effect, the address and size/datatype information may be used in various embodiments as pointers to the various parts of a running instance's memory in which the relevant state information to be included in a checkpoint can be found. In at least some embodiments the size may be variable for some objects 542—e.g., dynamically allocated objects may store state information in a list, an array or the like, and it may not be possible to determine the total size of the object in advance, as discussed below in the context of FIG. 6.

A number of data sources may be available to the descriptor generator 520 in various embodiments to help in the creation of the descriptor 540. For example, source code 510 of a version N of the LRP may include one or more source code files comprising the logic used to generate a checkpoint, and such files may be examined to help generate the tuples in some embodiments. The object or executable code 512 for the CLU-enabled version (and/or associated debug information such as symbol tables etc.) may be analyzed in some embodiments by the descriptor generator—e.g., portions of the object code involved in writes to a checkpoint may be disassembled to identify the data that is written and should therefore be included in the descriptor.

In some embodiments, a trace 514 of at least a portion of an execution of the CLU-enabled version N during which a checkpoint was generated may be analyzed to determine the contents of tuples 501. In one embodiment, a checkpoint 516 created from a CLU-enabled version of the LRP may be examined. The checkpoint 516 may, for example, be organized in an easy-to-parse format such as Javascript Object Notation (JSON) or a variant of the Extended Markup Language (XML), or otherwise annotated to indicate the objects, their addresses and sizes in some embodiments.

It is noted that in at least some embodiments, only a subset of the data sources and techniques illustrated in FIG. 5 may be used to generate the descriptor—e.g., if an annotated checkpoint is available, examining the source code or a trace may not be required. In one embodiment, respective parts of the descriptor tuples may be extracted from more than one data source—e.g., a source code file may be used to ascertain the names of state information containing objects, while other data sources may be used to obtain the addresses and/or sizes of the objects.

State Information Stored In Dynamically Allocated Memory

Figure 6:
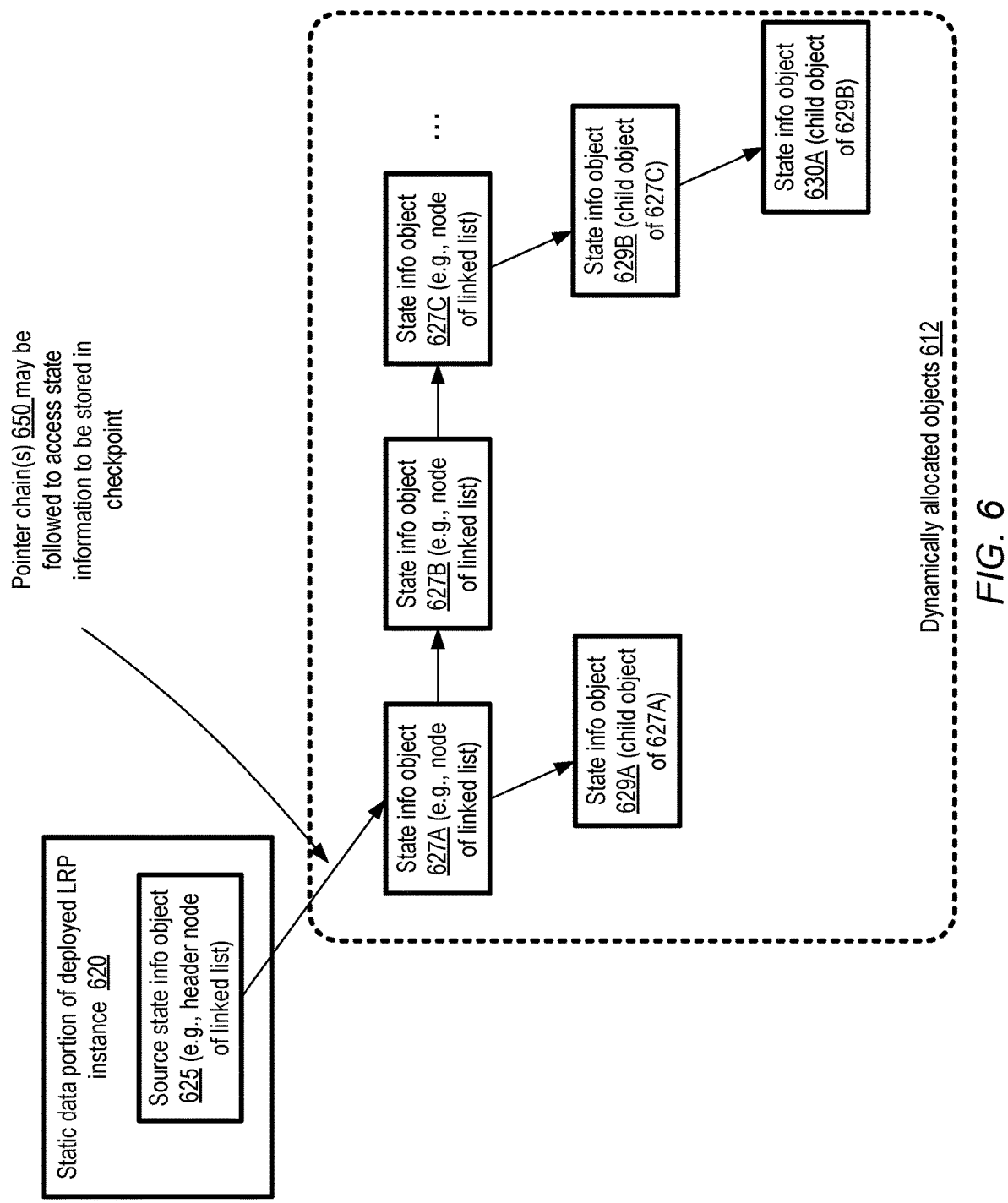
FIG. 6 illustrates an example extraction of program state information from dynamically allocated memory objects of a long-running program for inclusion in a checkpoint, according to at least some embodiments.

FIG. 6 illustrates an example extraction of program state information from dynamically allocated memory objects of a long-running program for inclusion in a checkpoint, according to at least some embodiments. In the depicted embodiment, state information pertaining to the operations of a long-running program (LRP) may be stored within a graph of dynamically allocated objects 612. In order to extract the state data stored in the dynamically allocated objects 612, the version manager may identify the location of a source object 625 (such as a header node of a linked list comprising data nodes 627A, 627B and 627C) for the graph within a static data section or portion of the memory of deployed LRP instance 620 in the depicted embodiment. For example, a structure called "DeviceList" may be defined as part of the static data, and the version manager may be able to determine a memory address where that structure is stored.

From the source object in the static data portion, one or more pointer chains 650 may be followed to access the state information that is to be included in a checkpoint of the running instance in the depicted embodiment. Multiple levels of pointer chains may be traversed in some embodiments. For example, as shown in the example scenario of FIG. 6, at a first level, a linked list comprising nodes 627A, 627B and 627C may be accessed, with the location of the next node in the list being indicated by a pointer within the previous node. However, individual nodes of then linked list, such as 627A or 627C, may also point to additional dynamically-allocated child objects (such as 629A, a child of 627A) which also contain state information to be included in the checkpoint in the example scenario. A child node of a linked list node, such as 629B, may in turn have a child node 630A of its own, and so on. The version manager may be responsible for finding and interpreting numerous pointers to extract state information from the dynamically-allocated objects in various embodiments.

Figure 7:
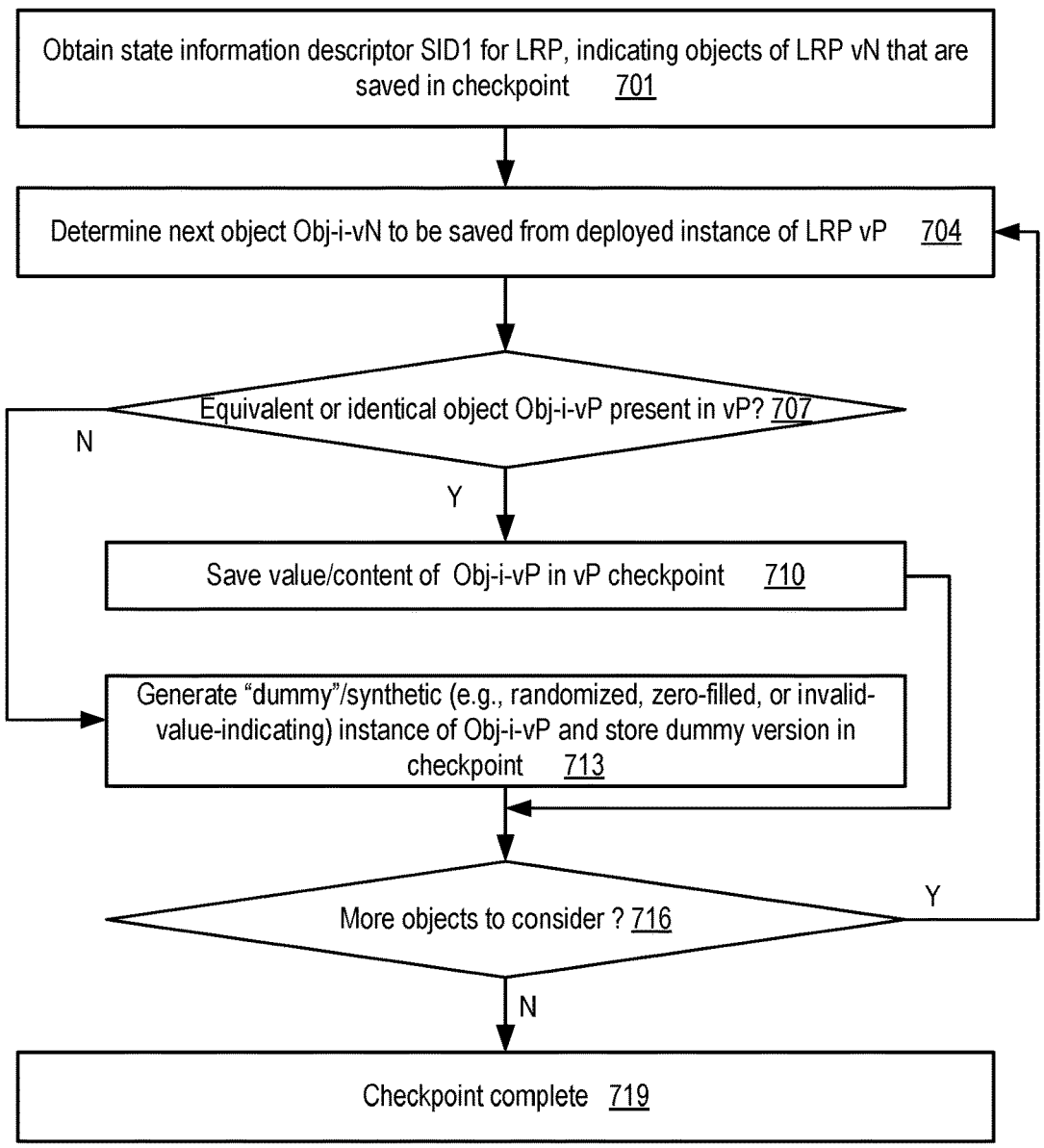
FIG. 7 is a flow diagram illustrating aspects of operations that may be performed in response to detecting that a particular element of state information that is saved in a checkpoint in a recent version of a program is not available in an older version of the program into which live update functionality is being introduced, according to at least some embodiments.

Dealing With Missing State Information In Older Versions Of Long-Running Programs As discussed earlier, the set of data structures that is used for storing program state information may vary from one version of a program to another. FIG. 7 illustrates is a flow diagram illustrating aspects of operations that may be performed in response to detecting that a particular element of state information that is saved in a checkpoint in a recent version of a program is not available in an older version of the program into which live update functionality is being introduced, according to at least some embodiments. As shown in element 701, a state information descriptor SID1 indicating a set of objects of a CLU-enabled version N of a long running program may be obtained, e.g., by a version management service or tool using the kinds of techniques described earlier. SID1 may, for example, comprise a set of tuples corresponding to respective data structures or variables containing state information of the program, indicating the structure names (or other semantic information), addresses, sizes and so on.

Individual ones of the state information-containing objects indicated in the descriptor SID1 may be considered sequentially in some embodiments; in other embodiments, the contents of several different objects may be ascertained in parallel, e.g., using respective threads of execution of a version manager agent. The next object Obj-i-vN whose value or content is to be saved from the deployed instance of LRP (version vP) may be determined (element 704) in the depicted embodiment. If that same object or its logical equivalent Obj-i-vP (i.e., an object with a slightly different name but with the same semantics) is present in the older deployed version of LRP, as detected in operations corresponding to element 707, its value may be stored in the checkpoint being generated for the running instance of the older version vP (element 710).

If the equivalent or identical object cannot be found in the memory being used by the deployed instance of version vP (as also detected in operations corresponding to element 707), a "dummy" instance of the object may be created and stored in the checkpoint in at least some embodiments. The dummy version, which may also be referred to as a synthetic or synthesized version, may be filled with zeros in some embodiments, or with randomly-selected values in other embodiments. In at least some embodiments, the value stored in the dummy object may be selected so as to clearly indicate that it is invalid—e.g., if Obj-i-vP included an integer value expected to be in the range 0-1023, a negative number such as −1 may be stored in the corresponding dummy object. The use of such invalidity indicators may be helpful in preventing undesired operations when the checkpoint is used to resume operations of the deployed instance in some embodiments, e.g., by preventing the misinterpretation of the dummy object while still ensuring that the checkpoint conforms to the format expected by the CLU module dynamically loaded into the deployed instance.

If SID1 indicates that there are more objects to consider and save, as detected in element 716, the operations corresponding to elements 704 onwards may be iterated or repeated with respect to the next object in the depicted embodiment, resulting in the gradual construction of more of the checkpoint with actual or dummy objects. When all the objects listed in SID1 have been dealt with, the checkpoint may be deemed complete (element 719) in various embodiments.

It is noted that in various embodiments, at least some operations other than those illustrated in the flow diagrams of FIG. 3 and FIG. 7 may be used to implement the version management techniques described above. Some of the operations shown may not be implemented in some embodiments or may be implemented in a different order, or in parallel rather than sequentially.

Build-Related Artifacts

Figure 8:
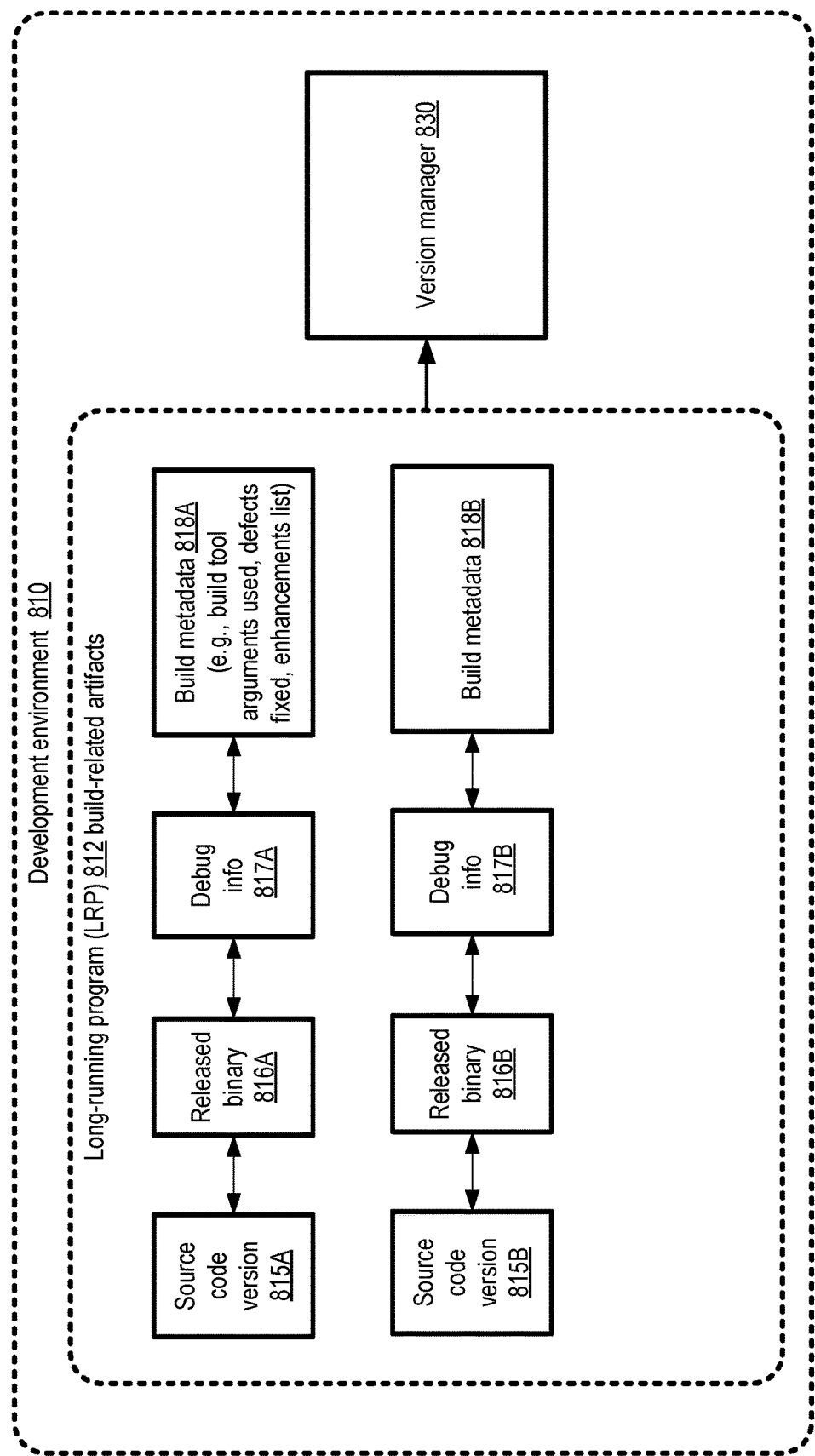
FIG. 8 illustrates examples of artifacts associated with builds of long-running programs that may be accessed by a version manager to introduce live update functionality, according to at least some embodiments.

FIG. 8 illustrates examples of artifacts associated with builds of long-running programs that may be accessed by a version manager to introduce live update functionality, according to at least some embodiments. In the depicted embodiment, a development environment 810 used for a long-running program LRP may comprise a plurality of build-related artifacts 812 associated with the different LRP versions produced over time.

Corresponding to respective ones of the released binaries of the LRP, such as binary 816A or 816B, the version of the source code 815 (e.g., 815A or 815B) may be stored in a source code repository in the depicted embodiment, and made accessible to the version manager 830. In at least some embodiments, debug information 817 (e.g., 817A or 817B) may be generated and stored in the development environment for the different versions, and consulted by the version manager 830 to identify state information locations and the like. The debug information may not be transmitted to the execution platforms where the LRP instances are executed in various embodiments, e.g., for performance or security reasons, so debug information may have to be obtained, if needed, from the build-related artifact database maintained in the development environment in such embodiments.

In at least one embodiment, the development environment may also be used to store additional build metadata 818 (e.g., 818A or 818B) for the respective released binaries 816 of the LRP. This metadata may include, for example, a list of command-line arguments used, and the particular version of the build tool used, to generate a given binary 816, the set of defects fixed in the version of the LRP, the set of enhancements or new features added, and so on. Such metadata may also be of use to the version manager 830—e.g., to reconstruct a released build in some cases, to check whether state information data structures in one version should be expected in another version, and so on.

Programmatic Interaction Example

Figure 9:
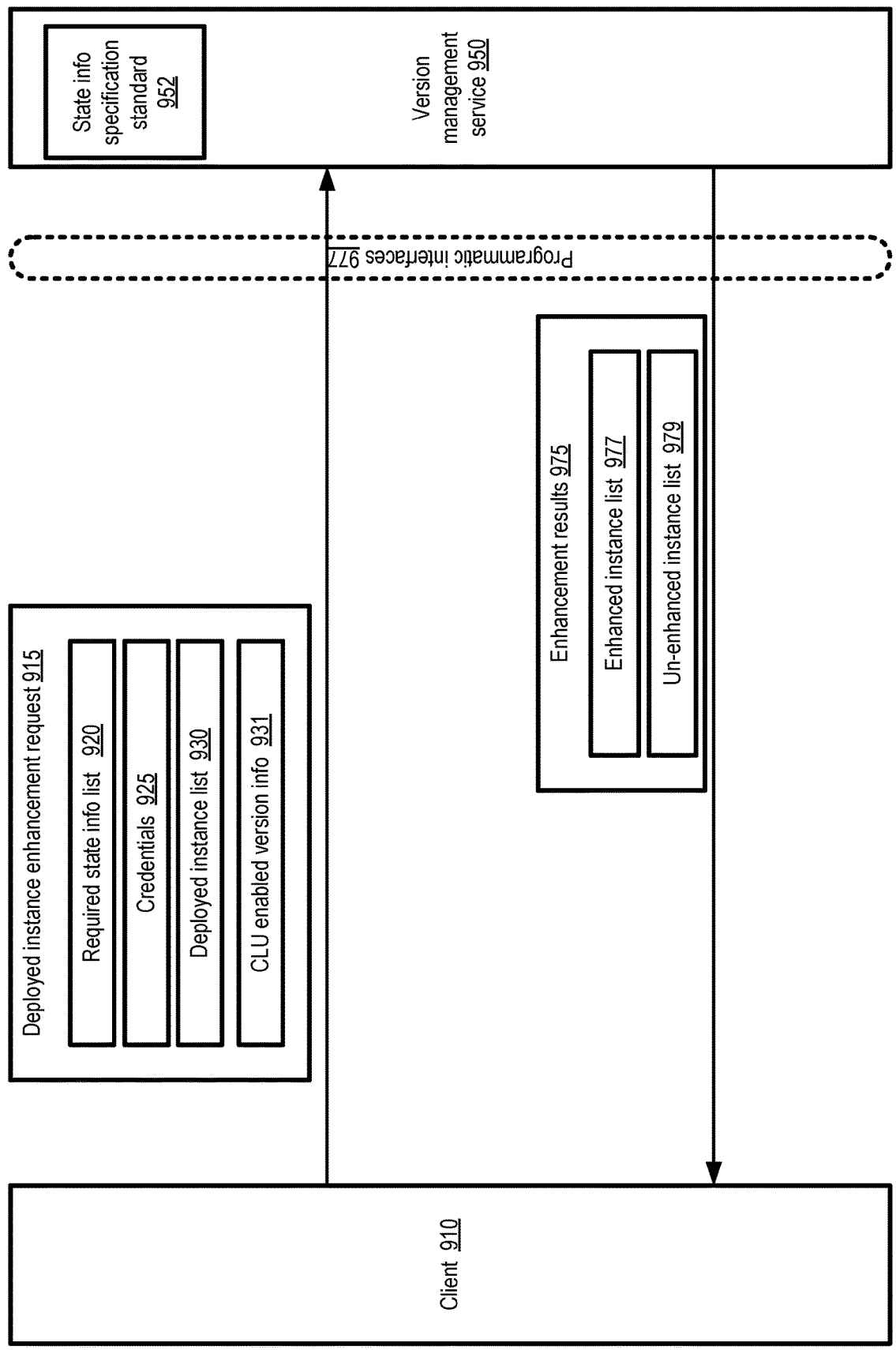
FIG. 9 illustrates examples of programmatic interactions with a version management service or tool, according to at least some embodiments.

FIG. 9 illustrates examples of programmatic interactions with a version management service or tool, according to at least some embodiments. In the depicted embodiment, a version management service or tool 950 implemented at one or more computing devices may expose a set of programming interfaces 977 to clients 910 that wish to enhance deployed instances of long-running programs. The programming interfaces 977 may include, for example, a set of application programming interfaces (APIs), a web-based console, command-line tools, graphical user interfaces or the like.

Using the interfaces 977, a client 910 may submit a deployed instance enhancement request 915 to the version management service 950 in some embodiments. The request 915 may comprise a number of parameters in the depicted embodiment, including, for example, a required state information list 920 indicating the types of state data to be saved in a checkpoint, a set of credentials 925 and/or a list 930 of the deployed instances to be modified by the service. The required state information list 920 may, for example, be formatted in accordance with a state information specification standard 952 provided by the service 950 in some embodiments. Such standardization may enable clients with a wide variety of long-running applications to have CLU functionality added in at least some embodiments. The credentials 925 may allow the service 950 to access and modify the running instances of the client's LRP in the depicted embodiment. In at least some embodiments, the request 915 may also include an indication of a CLU-enabled version 931, which may be used by the version management service to obtain the dynamically loadable module to be introduced into the deployed instances. In one embodiment, the request may include the CLU module itself In response to such a deployed instance enhancement request 915, the service 950 may attempt to implement the techniques described above to modify the running instances of the client's LRP in the depicted embodiment. An enhancement results message 975 may be transmitted to the client 910 in at least some embodiments. The results message may include a list of the instances 977 that were successfully modified and/or a list 979 of one or more instances of the client's LRP which could not be modified for some reason. Other types of programmatic interactions may be supported by the version manager service in various embodiments. For example, in one embodiment, a client may wish to ascertain whether the memory of a given deployed instance of a program contains a specific type of state information element, and the version management service may use its memory-accessing toolset to respond to a request for such information.

Use Cases

The techniques described above, of dynamically inserting live update capabilities into deployed instances of long-running programs, may be extremely useful in a number of scenarios. Many programs which support high-availability services (including for example, virtualized computing services at provider networks) may be expected to run for long time periods such as months or years without being terminated. The fleets at which such long-running programs are deployed may contain thousands of hosts. At any given point in time, respective instances of many different versions of a program may be running at different sets of hosts. Because of the constraints regarding termination avoidance, it may be the case that numerous older versions with respect to which enhanced newer versions are available may be allowed to continue running indefinitely. By obtaining descriptors of program state information elements that may be useful or essential for the correct functioning of the program, and adapting the descriptors for respective versions as needed (e.g., by inserting dummy/synthetic objects), it may become possible to generate checkpoints for versions of the program that may not have originally been designed or coded to support checkpoint-based live updates. Using the combination of the checkpoint capability and dynamically loaded modules for live update support, a version management service or tool may be able to bring all the different instances of the program to a single selected version. This may have multiple benefits, including the non-invasive and non-disruptive removal of defects that may have been present in older versions of the programs as well as reduction in the total number of distinct versions of the programs that have to be managed in a large fleet of computing devices.

Illustrative Computer System

Figure 10:
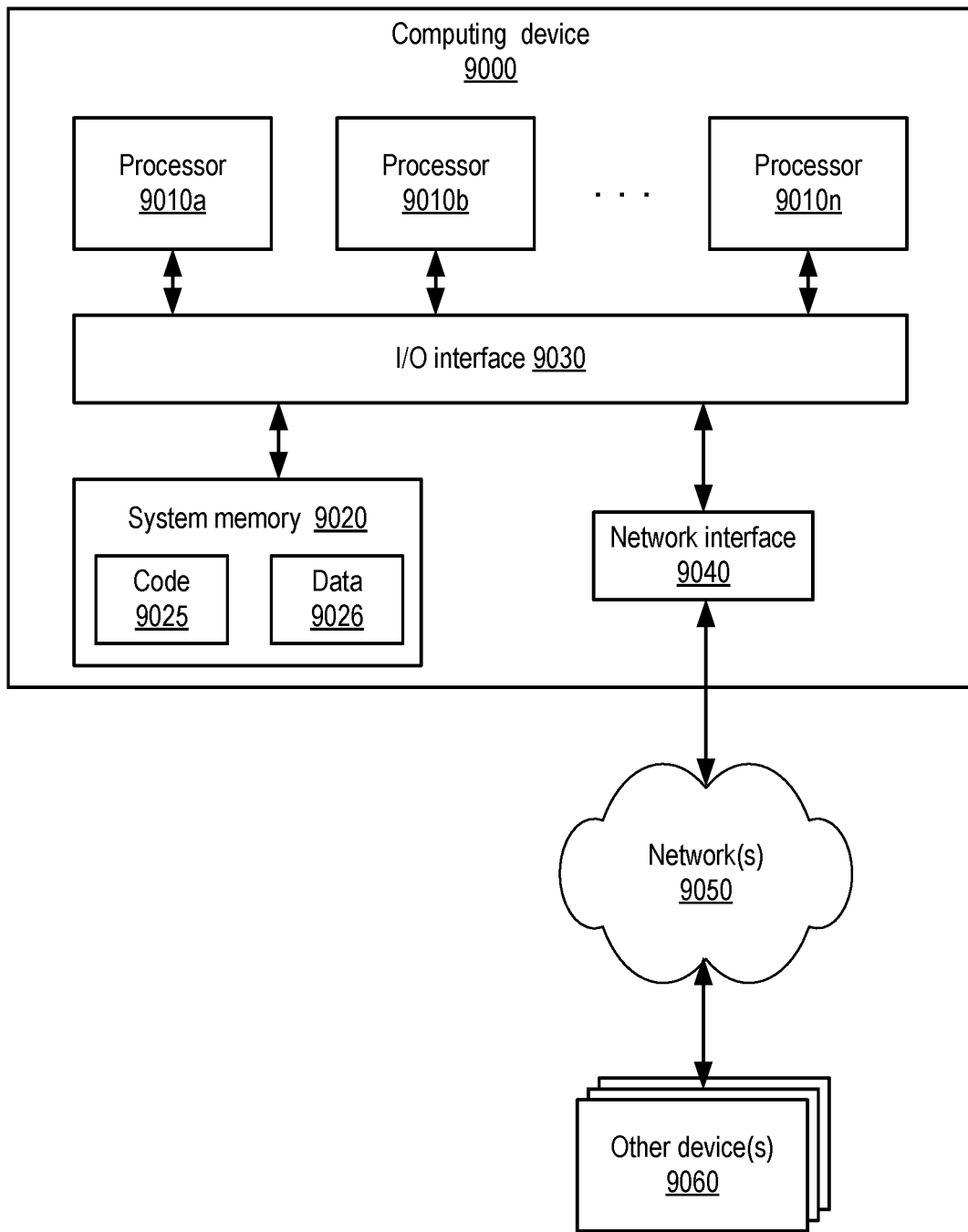
FIG. 10 is a block diagram illustrating an example computing device that may be used in at least some embodiments.

In at least some embodiments, a server that implements a portion or all of one or more of the technologies described herein, including the version managers, version manager agents, development environment components, and execution platforms, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices;
   wherein the one or more computing devices include instructions that upon execution on a processor cause the one or more computing devices to: obtain, from a first version of a program which includes checkpoint-based live update functionality, a descriptor of a first set of one or more objects comprising state information of the program to be stored in a checkpoint of the program, wherein checkpoint-based live update functionality, when updating, for an executing instance of a version of a program in which it is included uses the state information to avoid closing one or more open files or network connections to one or more applications that rely on or communicate with the executing instance;
   pause execution of a deployed instance of a different version of the program, wherein the different version does not include checkpoint-based live update functionality;
   identify, from a portion of a memory used by the deployed instance, a second set of one or more objects comprising at least a portion of the state information represented in the descriptor obtained from the first version of the program;
   store a checkpoint of the paused deployed instance, the checkpoint of the deployed instance comprising the second set of one or more objects comprising at least the portion of the state information represented in the descriptor;

add, into the paused deployed instance, a loadable module comprising code to implement the checkpoint-based live update functionality that, when updating, for the deployed instance, uses the state information to avoid closing one or more open files or network connections to one or more applications that rely on or communicate with the deployed instance;

resume, using the state information stored in the checkpoint of the deployed instance, execution of the paused deployed instance without closing one or more files or network connections that, when execution of the deployed instance was paused, were open to communicate with one or more applications; and perform a checkpoint-based live update of the deployed instance of the program using the loadable module added into the deployed instance.

2. The system as recited in claim 1, wherein to obtain the descriptor of the first set, the instructions upon execution on the processor cause the one or more computing devices to examine source code of the first version.

3. The system as recited in claim 1, wherein to obtain the descriptor of the first set, the instructions upon execution on the processor cause the one or more computing devices to examine a trace of an execution of the first version.

4. The system as recited in claim 1 wherein the instructions upon execution on the processor cause the one or more computing devices to: determine that a request to modify the deployed instance has been received via a programmatic interface of a version management service, wherein pausing of the deployed instance is responsive to the request.

5. The system as recited in claim 1, wherein to identify the second set of one or more objects, the instructions upon execution on a processor cause the one or more computing devices to attach, to the deployed instance, one or more of: (a) a trace tool or (b) a debugger.

6. A method, comprising:
performing, by one or more computing devices:
pausing execution of an instance of a program that does not include checkpoint-based live update functionality, wherein checkpoint-based live update functionality, when updating executing instance of a version of a program in which it is included, uses state information of the program to avoid closing one or more open files or network connections to one or more applications that rely on or communicate with the executing instance;

identifying, from a portion of a memory used by the instance that does not include the checkpoint-based live update functionality, a set of one or more objects comprising at least a portion of state information of the program;

storing a checkpoint of the paused instance, wherein the checkpoint comprises the set of one or more objects comprising at least the portion of the state information represented in a descriptor;

adding to the paused instance a loadable object comprising code to add the checkpoint-based live update functionality that, when updating the instance, uses the state information to avoid closing one or more open files or network connections to one or more applications that rely on or communicate with the instance;

resuming, using the state information stored in the checkpoint of the instance, execution of the paused instance of the program without closing one or more files or network connections that, when execution of the instance was paused, were open to communicate with one or more applications; and performing a checkpoint-based live update of the instance of the program using the loadable object added to the instance.

7. The method as recited in claim 6, wherein identifying the set of one or more objects comprises obtaining the descriptor of the one or more objects comprising at least the portion of the state information.

8. The method as recited in claim 7, further comprising performing, by the one or more computing devices:
determining that the memory being used by the instance does not comprise a particular data structure in which an element of the one or more elements is stored; and
including, in the checkpoint, a synthetic version of the particular data structure.

9. The method as recited in claim 7, wherein the instance corresponds to a first version of the program, wherein the descriptor is obtained from a second version of the program, and wherein the second version includes checkpoint-based live update functionality.

10. The method as recited in claim 6, wherein identifying the set of one or more objects comprises:
examining debug information of a particular version of the program corresponding to the instance.

11. The method as recited in claim 10, wherein examining the debug information comprises accessing a database of build-related artifacts.

12. The method as recited in claim 6, further comprising performing, by the one or more computing devices:
determining that a request to modify the instance has been received via a programmatic interface of a version management service, wherein pausing execution of the instance is responsive to the request.

13. The method as recited in claim 12, wherein the request comprises an indication of the set of one or more objects.

14. The method as recited in claim 6, wherein identifying the set of one or more objects comprises following one or more pointers indicated in a data section of the portion of the memory.

15. One or more non-transitory computer-accessible storage media storing program instructions that when executed on or across one or more processors:
cause execution of an instance of a program that does not include checkpoint-based live update functionality to be paused, wherein checkpoint-based live update functionality, when updating an executing instance of a version of a program in which it is included, uses state information of the program to avoid closing one or more open files or connections to one or more applications that rely on or communicate with the executing instance;

identify, from a portion of a memory used by the instance, a set of one or more objects comprising at least a portion of state information of the program;

store a first checkpoint of the paused instance, the first checkpoint comprising the set of one or more objects comprising the state information; and add to the paused instance a loadable object comprising code to add the checkpoint-based live update functionality that, when updating the instance, uses the state information to avoid closing one or more open files or connections to one or more applications that rely on or communicate with the instance;

resume, using the state information stored in the first checkpoint of the paused instance, execution of the paused instance of the program without closing one or more files or network connections that, when execution of the instance was paused, were open to communicate with one or more applications; and perform a checkpoint-based live update of the instance of the program using the loadable object added to the instance.

16. The non-transitory computer-accessible storage media as recited in claim 15, wherein to identify the set of one or more objects, the instructions when executed on or across the one or more processors:

obtain, from a version of the program which includes checkpoint-based live update functionality, the descriptor of the state information to be used for resuming execution of the paused instance.

17. The non-transitory computer-accessible storage media as recited in claim 16, wherein the instructions when executed on or across the one or more processors:

determine that memory being used by the instance does not comprise a particular data structure in which an element of the one or more elements is stored; and include, in the first checkpoint, a synthetic version of the particular data structure.

18. The non-transitory computer-accessible storage media as recited in claim 16, wherein the instance corresponds to a first version of the program, wherein the descriptor is obtained from a second version of the program, and wherein the second version includes the checkpoint-based live update functionality.

19. The non-transitory computer-accessible storage media as recited in claim 18, wherein to obtain the descriptor, the instructions when executed on or across the one or more processors: (a) examine source code of the second version or (b) examine object code of the second version.

20. The method as recited in claim 9, wherein obtaining the descriptor comprises one or more of: (a) examining source code of the instance of the second version or (b) examining object code of the second version.

\* \* \* \* \*